US008622803B2

(12) United States Patent
Cuddy et al.

(10) Patent No.: US 8,622,803 B2
(45) Date of Patent: Jan. 7, 2014

(54) GAMING SYSTEMS AND METHODS AND ROTATING ASSEMBLIES FOR USE THEREIN

(75) Inventors: Ryan W. Cuddy, Reno, NV (US); Eric Steven Boese, Sparks, NV (US); Thomas J. O'Brien, Henderson, NV (US)

(73) Assignee: IGT, Reno, NV (US)

(*) Notice: Subject to any disclaimer, the term of this patent is extended or adjusted under 35 U.S.C. 154(b) by 704 days.

(21) Appl. No.: 12/489,890

(22) Filed: Jun. 23, 2009

(65) Prior Publication Data

US 2010/0323776 A1 Dec. 23, 2010

(51) Int. Cl.
*A63F 9/24* (2006.01)
*A63F 13/00* (2006.01)

(52) U.S. Cl.
USPC .................. 463/20; 463/16; 463/31; 463/32; 273/138.1; 273/138.2; 273/143 R

(58) Field of Classification Search
USPC ........ 463/16, 20, 31, 32; 273/138.1–2, 143 R
See application file for complete search history.

(56) References Cited

U.S. PATENT DOCUMENTS

| | | | | |
|---|---|---|---|---|
| 6,135,884 | A | 10/2000 | Hedrick et al. | |
| 6,312,334 | B1 * | 11/2001 | Yoseloff | 463/25 |
| 6,663,488 | B1 | 12/2003 | Adams | |
| 6,808,452 | B2 * | 10/2004 | Baerlocher et al. | 463/17 |
| 7,144,321 | B2 | 12/2006 | Mayeroff | |
| 7,179,169 | B2 | 2/2007 | Beaulieu et al. | |
| 7,306,518 | B2 * | 12/2007 | Hughs-Baird et al. | 463/16 |
| 7,311,604 | B2 * | 12/2007 | Kaminkow et al. | 463/20 |
| 7,326,112 | B2 * | 2/2008 | Nordman | 463/20 |
| 7,354,342 | B2 * | 4/2008 | Paulsen et al. | 463/16 |
| 7,427,236 | B2 | 9/2008 | Kaminkow et al. | |
| 7,431,649 | B2 | 10/2008 | Webb et al. | |
| 7,500,914 | B2 * | 3/2009 | Rodgers et al. | 463/20 |
| 2004/0214630 | A1 * | 10/2004 | Mayeroff | 463/20 |
| 2005/0049038 | A1 | 3/2005 | Cuddy et al. | |
| 2006/0019738 | A1 | 1/2006 | Baerlocher et al. | |
| 2007/0054723 | A1 * | 3/2007 | Mattice et al. | 463/16 |

(Continued)

FOREIGN PATENT DOCUMENTS

WO 2007018633 A2 2/2007

OTHER PUBLICATIONS

Notification of Transmittal of the International Search Report and the Written Opinion of the International Searching authority, or the Declaration, PCT/US2010/036548, Jul. 26, 2010, 5 pages.

*Primary Examiner* — Dmitry Suhol
*Assistant Examiner* — Ryan Hsu
(74) *Attorney, Agent, or Firm* — Foley & Lardner LLP

(57) ABSTRACT

A gaming machine includes a memory, a first display device configured to display a first game, a second display device configured to display a second game, and a processor coupled to the memory, to the first display device, and to the second display device. The second display device includes a plurality of segments, wherein at least one of the segments is an electronic display device. The processor is configured to enable play of the first game in response to a wager made by the player, enable play of the second game upon detection of a triggering event during play of the first game, and during play of the first game and the second game, update the electronic display device to reflect a current award value.

34 Claims, 9 Drawing Sheets

(56) References Cited

U.S. PATENT DOCUMENTS

2007/0054727 A1 3/2007 Garamendi et al.
2007/0129128 A1 * 6/2007 McClintic .......................... 463/9
2007/0149281 A1 * 6/2007 Gadda et al. .................... 463/34
2008/0108411 A1 5/2008 Jensen et al.
2008/0113756 A1 5/2008 Williams et al.
2009/0111577 A1 * 4/2009 Mead .............................. 463/31
2009/0124362 A1 5/2009 Cuddy et al.

* cited by examiner

GAMING SYSTEMS AND METHODS AND ROTATING ASSEMBLIES FOR USE THEREIN

BACKGROUND OF THE INVENTION

The embodiments described herein relate generally to gaming machines and gaming systems and, more specifically, gaming machines and gaming systems that include rotatable bonus wheels that include one or more continually-updated scrolling progressive displays.

At least some known gaming machines and/or gaming systems include a bonus wheel that a player must spin in order to determine a jackpot award. In some of such machines and/or systems, the player is presented with an opportunity to spin the bonus wheel after specifically identified combinations appear on a payline. In some of such known machines and/or systems, spinning the bonus wheel enables the player to increase or decrease a payout that is defined within a paytable. For example, if the bonus wheel stops on a sector having an increased payout, the player's winnings are increased by the value displayed in the paytable. If the bonus wheel stops on a sector having a decreased payout, the player's winnings are reduced by an amount specified on the sector. However, such known gaming machines and/or gaming systems do not provide the player with a continually-updated progressive award amount using a display device that makes up one of the sectors.

Accordingly, it is desirable to provide a multi-level progressive game for use with gaming machines and/or gaming networks, wherein a rotating bonus wheel includes one or more scrolling progressive displays that each display a continually updated progressive award amount.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a gaming machine is provided, including a memory, a first display device configured to display a first game, a second display device configured to display a second game, and a processor coupled to the memory, the first display device, and the second display device. The second display device includes a plurality of segments, wherein at least one of the segments is an electronic display device. The processor is configured to enable play of the first game in response to a wager made by the player, enable play of the second game upon detection of a triggering event during play of the first game, and during play of the first game and the second game, update the electronic display device to reflect a current award value.

In another aspect, a gaming machine is provided, including a memory, a rotatable display device that includes a plurality of segments, and a processor coupled to the memory and the rotatable display device. At least one of the segments of the rotatable display device is an electronic display device. The processor is configured to enable play of a first game based on a wager made by a player, detect a triggering event during play of the first game, enable play of a second game based on the detection of the triggering event, and during play of the first game and the second game, update the electronic display device to reflect a current award value of a progressive game.

In another aspect, a gaming method is provided that includes accepting a wager made by a player of a gaming machine, enabling play of a first game using the gaming machine, wherein the first game is display using a first display device, and detecting a triggering event during play of the first game. Play of a second game using the gaming machine is enabled upon detection of the triggering event, wherein the second game is displayed using a second display device having a plurality of segments. At least one of the segments is an electronic display device. During play of the first game and the second game, the electronic display device is updated to reflect a current award value.

In yet another aspect, a gaming system is provided that includes a plurality of gaming machines, a shared display configured to display a second game, and a controller coupled to the gaming machines and the shared display. Each gaming machine configured to display a first game, and the shared display includes a plurality of segments, wherein at least one of the segments is an electronic display device. The controller is configured to detect a triggering event during play of the first game on at least one of the gaming machines, enable play of the second game upon detection of the triggering event, and during play of the first game and the second game, update the electronic display device to reflect a current award value.

In another aspect, a gaming method is provided, including accepting a wager made by a player using at least one of a plurality of gaming machines, enabling play of a first game using the gaming machines, and detecting a triggering event during play of the first game. The method also includes enabling play of a second game, wherein the second game is displayed using a shared display having a plurality of segments. At least one of the segments is an electronic display device. The method also includes during play of the first game and the second game, updating the electronic display device to reflect a current award value.

BRIEF DESCRIPTION OF THE DRAWINGS

The embodiments described herein may be better understood by referring to the following description in conjunction with the accompanying drawings.

DETAILED DESCRIPTION OF THE INVENTION

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Technical effects of methods, systems, and apparatus described herein include at least one of (a) accepting a wager by a player using a gaming machine; (b) enabling play of a first game using the gaming machine, wherein the first game is displayed using a first display device; (c) determining an outcome of the first game; (d) awarding the player if the outcome of the first game is a winning outcome; (e) determining whether the outcome of the first game includes a triggering event; (f) if the outcome of the first game includes a triggering event, initiating play of a second game using a second display device, wherein the second display device includes a plurality of segments, at least a portion of which are electronic display devices configured to update, such as continuously update, a respective award value; and (g) awarding the player based on an outcome of the second game.

Figure 1:
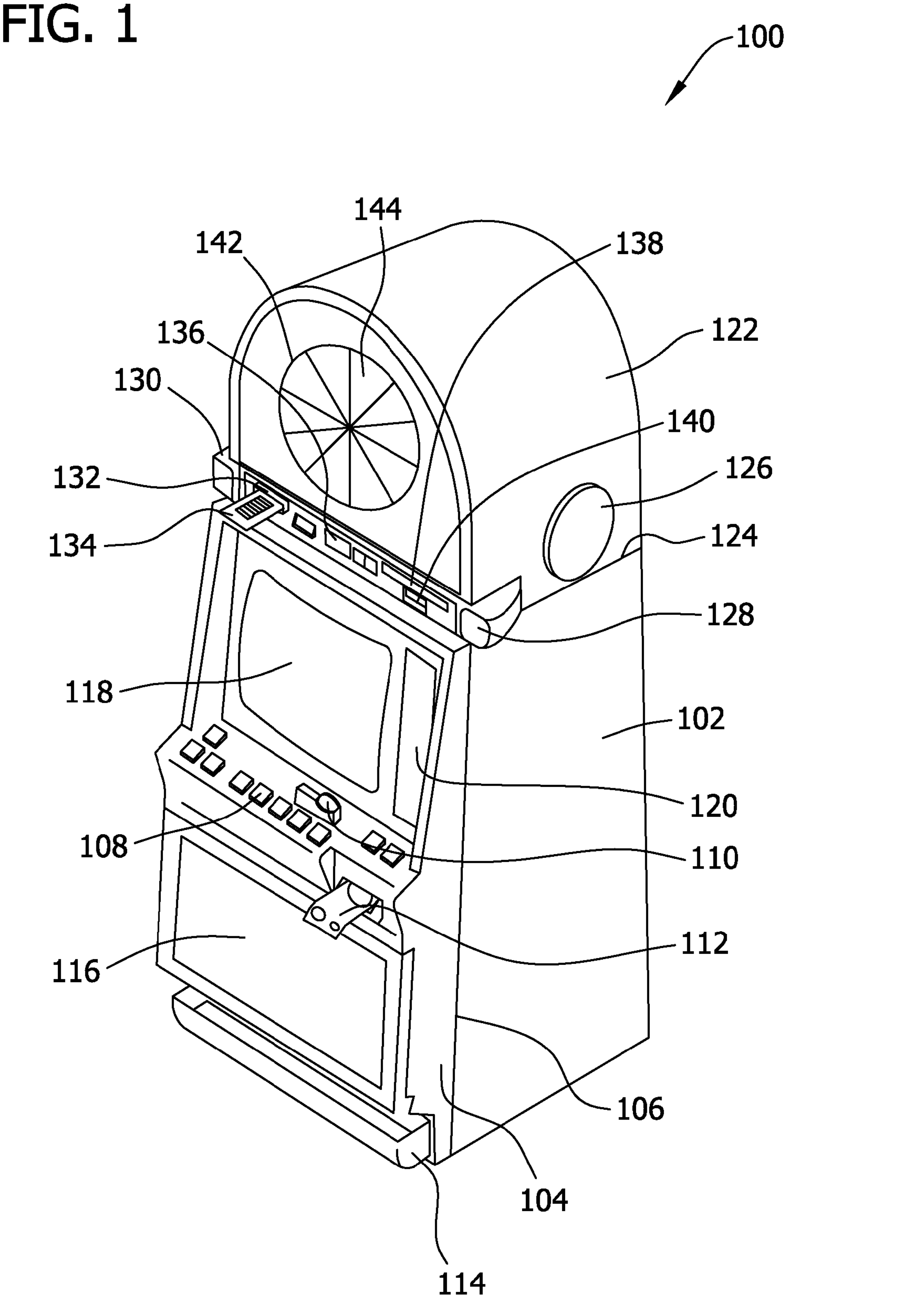
FIG. 1 is a schematic diagram of an exemplary gaming machine.

FIG. 1 is a schematic diagram of an exemplary gaming machine 100 that includes a bonus wheel that includes one or more segments that display a continuously updating award amount (not shown in FIG. 1). Gaming machine 100 may be any type of gaming machine, and may include different structures or components other than those shown in FIG. 1. Moreover, gaming machine 100 may use different methods of operation than those described below.

In the exemplary embodiment, gaming machine 100 includes a main cabinet 102 that includes a main door 104 that is coupled to a front 106 of gaming machine 100 via a hinge (not shown). When opened, door 104 provides access to an interior (not shown) of gaming machine 100. In the exemplary embodiment, a plurality of player-input switches and/or buttons 108 are coupled to main door 104. Moreover, in the exemplary embodiment, a coin acceptor 110, for accepting coins and/or tokens, a bill acceptor 112, for accepting and/or validating cash bills, a coin tray 114, for collecting a coin-based payout, and a belly glass 116 are each coupled to main door 104. A video display 118 and an information panel 120 are viewable through main door 104. In the exemplary embodiment, video display 118 is implemented via a plurality of lighting devices (not shown in FIG. 1), such as a light emitting diode (LED) lighting display. However, in alternative embodiments, video display 118 may be implemented as a cathode ray tube (CRT), a flat-panel liquid crystal display (LCD), a plasma display, an organic light-emitting diode (OLED) display, and/or any other electronically-controlled video display that incorporates a plurality of light devices. Moreover, video display 118 may include touch screen capabilities. In some embodiments, symbols, images, and/or indicia displayed by video display 118 may be in mechanical form. Accordingly, video display 118 may include any suitable electromechanical devices that moves one or more mechanical objects, such as one or more mechanical rotatable wheels, reels, or dice. In the exemplary embodiment, information panel 120 is a back-lit, silk screened glass panel that includes lettering indicative of general game information including, for example, a number of coins wagered. Coin acceptor 110, bill acceptor 112, player-input buttons 108, video display 118, and information panel 120 are each used by a player to play a game on gaming machine 100. Each component 108, 110, 112, 118, and/or 120 is controlled by a gaming machine controller (not shown in FIG. 1) that is housed inside main cabinet 102. Numerous games including, but not limited to only including, video slot games, video poker, video pachinko, video black jack, video card games, and/or video keno may be implemented for play on gaming machine 100.

In the exemplary embodiment, gaming machine 100 also includes a top box 122 that is positioned on a top surface 124 of main cabinet 102. In the exemplary embodiment, top box 122 includes a number of devices that may be used to add features to a game being played on gaming machine 100. Such devices may include, but are not limited to only including, speakers 126, 128, and 130, a ticket printer 132 for printing bar-coded tickets 134, a key pad 136 for entering player tracking information, or player preferences or characteristics, a florescent display 138 for displaying player tracking information and/or player preferences or characteristics, and a card reader 140 for receiving a magnetic striped card containing player tracking information and/or player preferences or characteristics encoded thereon. Card reader 140 may also be used to accept coupons, credit cards, printed cards, smart cards, and/or ticket vouchers. Moreover, top box 122 includes a bonus wheel 142 that may be used to add bonus features to a game being played on gaming machine 100. Bonus wheel 142 includes a plurality of segments 144. In the exemplary embodiment, a portion of segments 144 are embodied as display devices (not shown in FIG. 1). As explained in greater detail below, each of these display devices is updated, such as continuously updated, to reflect a current respective award amount, such as a progressive bonus award amount. During game play, such devices may be controlled by circuitry, such as the gaming machine controller (not shown in FIG. 1) housed within main cabinet 102.

Figure 2:
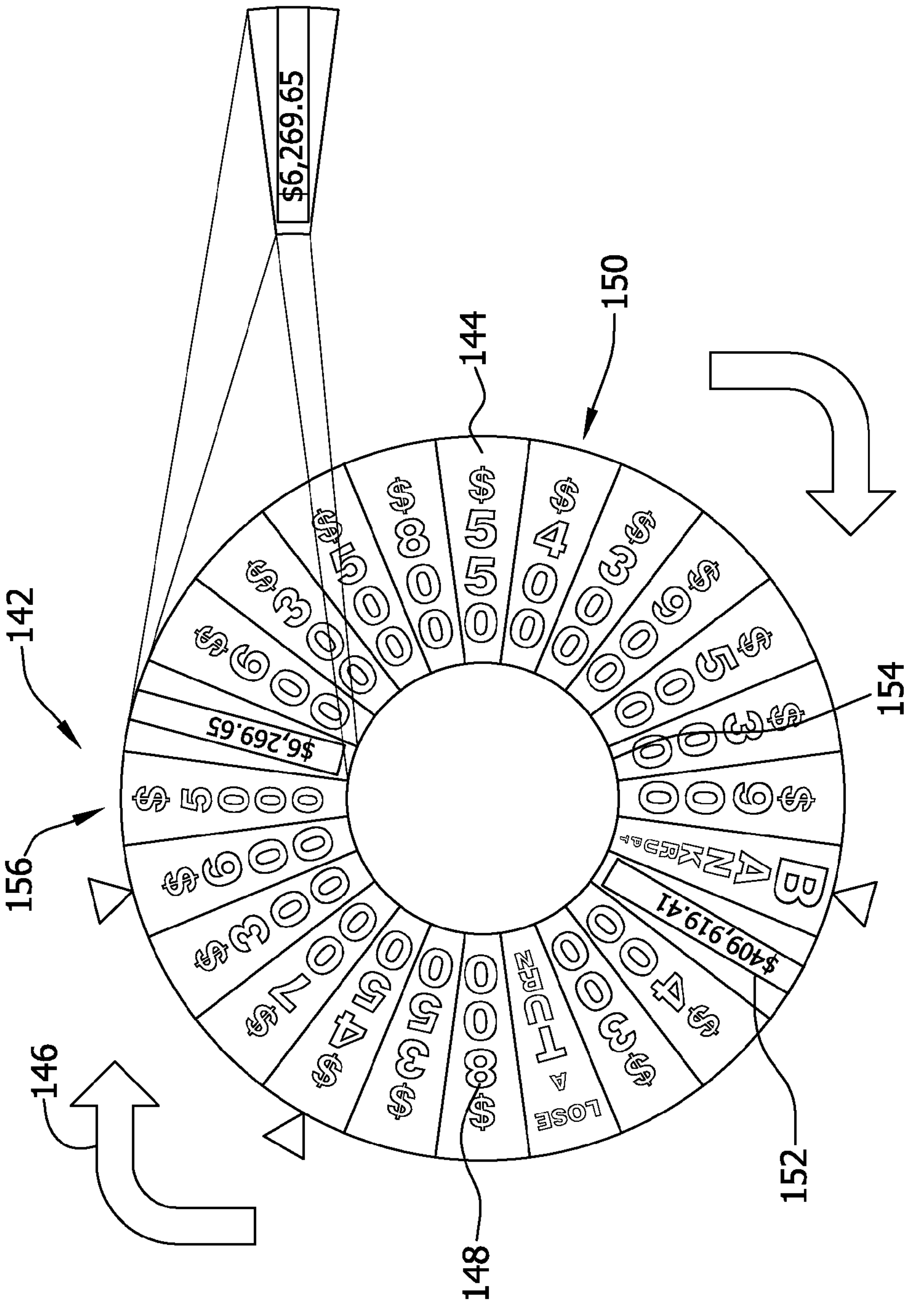
FIG. 2 is a diagram of an exemplary bonus wheel that may be used with the gaming machine shown in FIG. 1.

FIG. 2 is a diagram of an exemplary bonus wheel 142 that may be used with gaming machine 100 (shown in FIG. 1). In the exemplary embodiment, bonus wheel 142 is configured to rotate in a clockwise direction as indicated by arrow 146. In an alternative embodiment, bonus wheel 142 is configured to rotate in a counterclockwise direction. In the exemplary embodiment, bonus wheel 142 is a mechanical wheel that includes a plurality of segments 144. An award symbol 148 is associated with each segment 144, and one or more awards are associated with each award symbol 148. The awards may be any suitable award including, but not limited to only including, credits, free wheel spins, free plays of the primary game, award multipliers, and/or any other award opportunities that may be made available. In addition to bonus wheel 142, top box 122 (shown in FIG. 1) may also include one or more segment indicators 150. Each segment indicator 150 may be separately designated by, for example, colors, characters, numbers, images, and/or any other suitable designation. Each segment indicator 150 is positioned with respect to bonus wheel 142 to indicate one of segments 144 after completion of a wheel spin. In an alternative embodiment, bonus wheel 142 remains stationary and each segment indicator 150 is rotated in either a clockwise direction in accordance with arrow 146, or in a counterclockwise direction. In another alternative embodiment, bonus wheel 142 is an animated display that is generated by a secondary display device (not shown).

Moreover, in the exemplary embodiment, at least a portion of segments 144 are embodied using electronic display devices 152. Each electronic display device 152 receives, such as continuously receives, an award value from, for example, a network controller (not shown in FIG. 2). For example, the network controller monitors an amount of "coin in" within a group of gaming machines 100 and determines a progressive bonus amount and/or jackpot bonus amount based at least on the monitored coin in amount. The network controller transmits the progressive bonus amount to a gaming machine controller (not shown in FIG. 2). The gaming machine controller then causes each electronic display device 152 to update, such as continuously update, the displayed progressive bonus amount. If bonus wheel 142 stops at the completion of a bonus spin such that a particular segment indicator 150 that was purchased by a player indicates a particular electronic display device 152, the player is awarded the progressive bonus amount indicated by electronic display device 152. In some embodiments, each electronic display device 152 is coupled to a slip ring (not shown) in order to provide power and/or communications from, for example, a gaming machine controller. Moreover, in some embodiments, a plurality of electronic display devices 152 are spaced evenly about a center 154 of bonus wheel 142. In addition, in some embodiments, each electronic display device 152 is configured to re-orient the displayed progressive amount during the course of wheel rotation. For example, if a value such as $12,345.67 is displayed on a particular electronic display device 152 at a position of approximately 90° from a top position 156 of bonus wheel 142, the digits will be re-oriented each time the particular electronic display device 152 is rotated an additional 90°. In such a manner, viewers are able to read the amount without seeing the numbers oriented sideways or upside down. Each electronic display device 152 may be implemented using, for example, a light-emitting diode (LED) display, a liquid crystal display (LCD), a vacuum fluorescent display (VFD), or multi-layer display (MLD).

Figure 3:
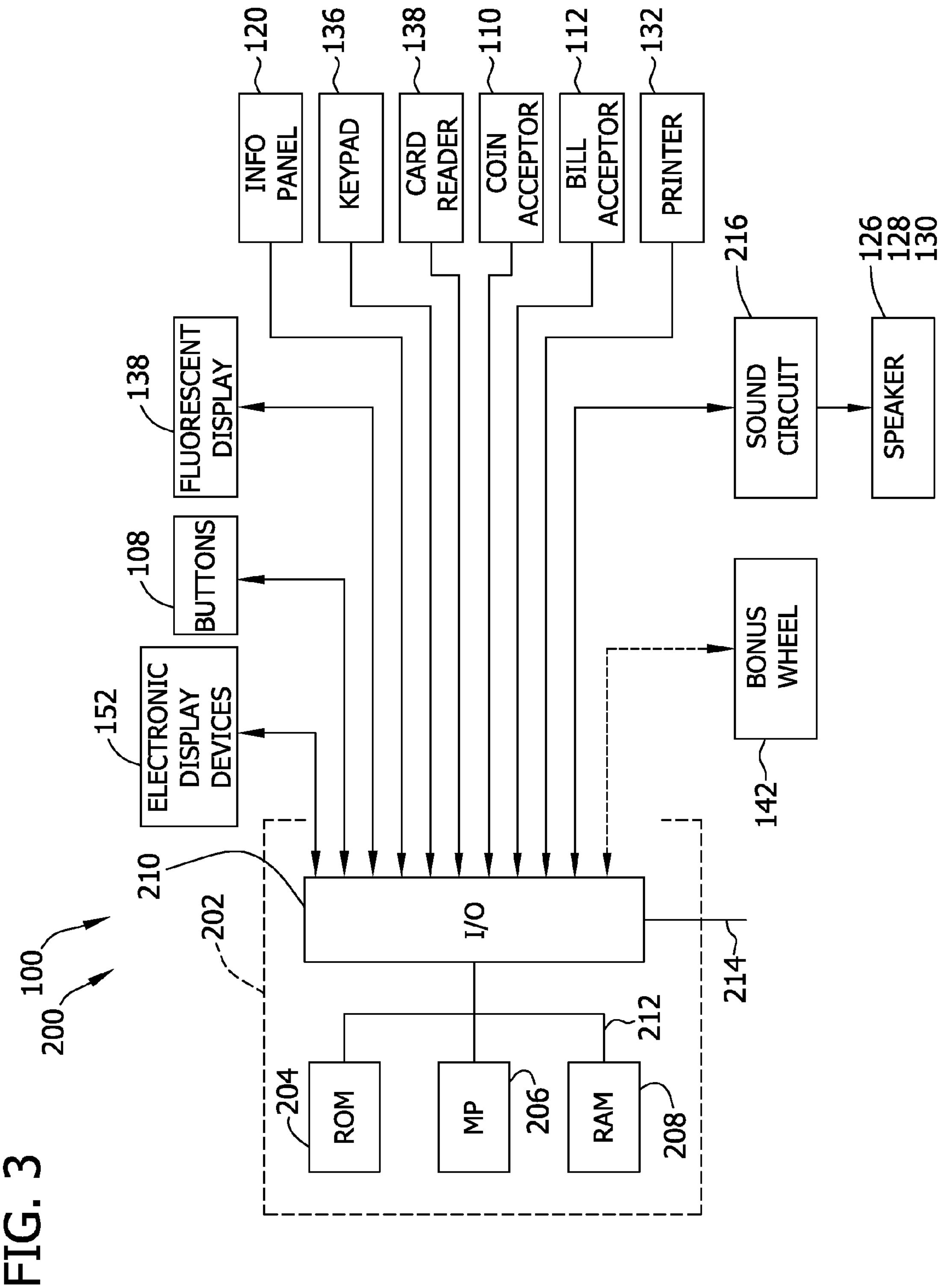
FIG. 3 is a block circuit diagram of an exemplary electrical architecture that may be used with the gaming machine shown in FIG. 1 and the bonus wheel shown in FIG. 2.

FIG. 3 is a block circuit diagram of an exemplary electrical architecture 200 incorporated into an exemplary gaming machine, such as gaming machine 100. In the exemplary embodiment, gaming machine 100 includes a gaming machine controller 202 that includes a read-only memory (ROM) 204, a microcontroller or microprocessor (MP) 206, a random-access memory (RAM) 208, and an input/output (I/O) circuit 210, that are each coupled via an address/data bus 212. As used herein, the terms "controller" and "processor" may include any programmable system including, but not limited to, systems using microcontrollers, reduced instruction set circuits (RISC), application specific integrated circuits (ASICs), logic circuits, and/or any other circuit or processor capable of executing the functions described herein. Such examples are exemplary only, and are thus not intended to limit in any way the definition and/or meaning of the terms "controller" or "processor". Alternative embodiments of controller 202 may include more than one microprocessor 206, multiple RAM modules 208, and/or multiple ROM modules 204. Moreover, although I/O circuit 210 is shown in FIG. 2 as a single component, one of ordinary skill in the art should appreciate that I/O circuit 210 may include any number or a plurality of different types of I/O circuits. Furthermore, RAM 208 and/or ROM 204 may be implemented as, for example, semiconductor memories, magnetically readable memories, and/or optically readable memories. In one embodiment, each operational component of gaming machine 100 is coupled to I/O circuit 210 via a respective conductor. Alternative embodiments may include only a single coupling between the operational components of gaming machine 100 and I/O circuit 210. In the exemplary embodiment, I/O circuit 210 is coupled to a gaming network (not shown) via a network interface 214. Moreover, in the exemplary embodiment, architecture 200 includes a sound circuit 216 that generates audio signals and that communicates audio signals between I/O circuit 210 and speakers 126, 128, and/or 130.

Moreover, in the exemplary embodiment, controller 202 is coupled to bonus wheel 142 and electronic display devices 152. More specifically, I/O circuit 210 is coupled to bonus wheel 142 in order to communicate instructions to bonus wheel 142 including, for example, instructions related to bonus spin starts, lighting sequences, and/or bonus spin stops. I/O circuit 210 is also coupled to electronic display devices 152 in order to communicate, for example, updated progressive award amounts and/or re-orientation instructions.

Figure 4:
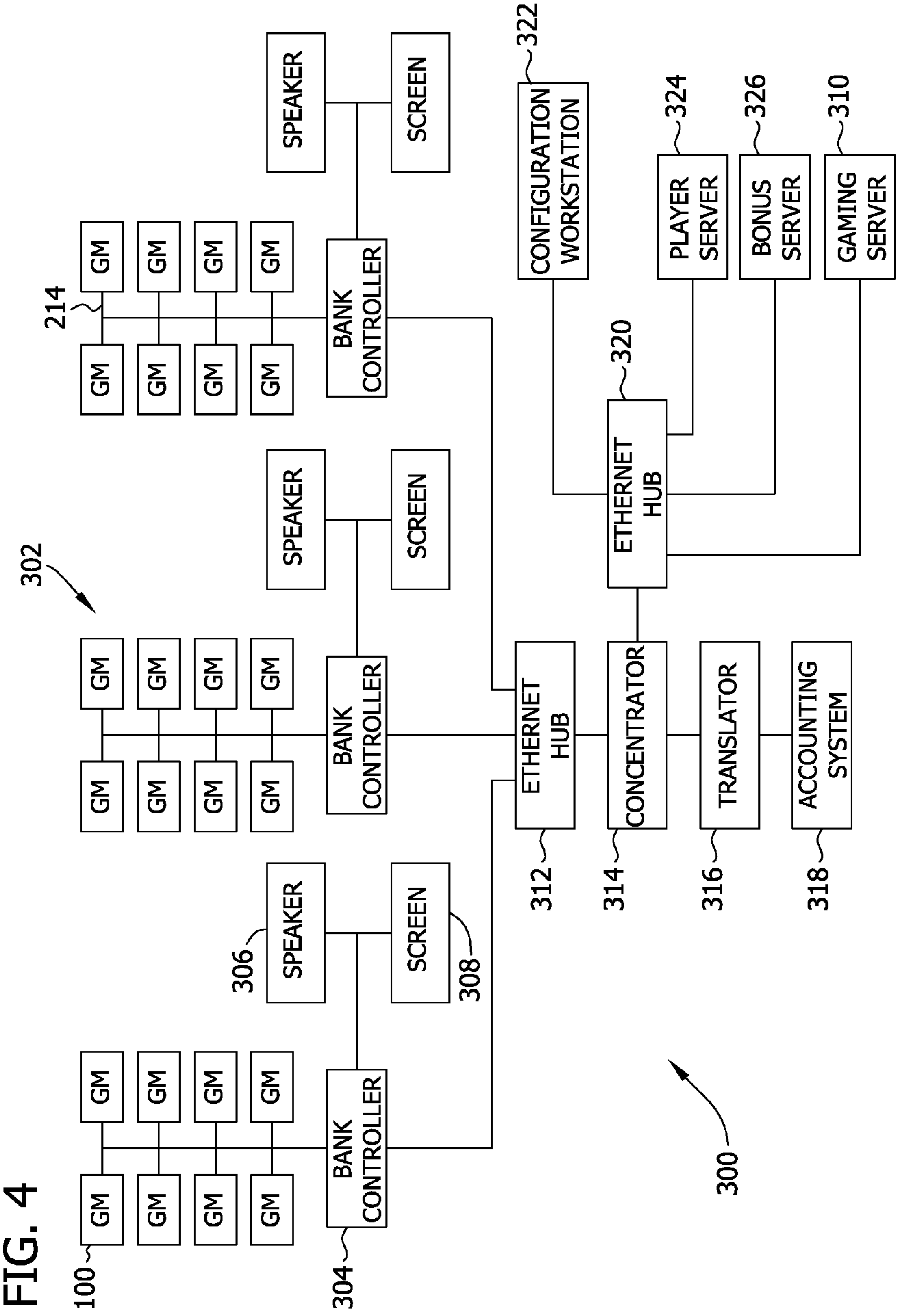
FIG. 4 is a block diagram of an exemplary gaming network that includes a plurality of the gaming machines shown in FIG. 1.

FIG. 4 is a block diagram of an exemplary gaming network 300 that includes a plurality of gaming machines 100. Specifically, FIG. 4 shows three banks 302 of gaming machines 100. Each gaming machine 100 is coupled via a network connection 214 to a bank controller 304. In one embodiment, each bank controller 304 includes a processor (not shown) that facilitates data communication between each gaming machine 100 within each bank 302, and between each gaming machine 100 and other components of gaming network 300. In one embodiment, each bank controller 304 also includes audio capabilities, such as a CD-ROM drive (not shown) or DVD-ROM drive (not shown), that are coupled to a sound card (not shown) for processing and transmitting digitized sound effects to one or more speakers 306 in response to commands issued over gaming network 300 by bank controller 304. Each bank controller 304 is also coupled via gaming network 300 to an electronic sign or screen 308 that displays information, such as via scrolling and/or flashing messages that indicate, for example, progressive and/or jackpot amounts, and that are visible to players playing gaming machines 100. Messages for display on each electronic screen 308 are generated and/or modified in response to commands issued over gaming network 300 by bank controller 304.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a remote gaming server 310. In such an embodiment, gaming machine 100 displays results of the game played on gaming server 310 via video display monitor 118 (shown in FIG. 1).

A network connector, such as an Ethernet hub 312, couples each bank controller 304 to a concentrator 314. Concentrator 314 functions as a data control switch that routes data from each bank 302 to a translator 316. Translator 316 provides a compatibility buffer (not shown) between concentrator 314 and an accounting system 318. Moreover, translator 316 converts data gathered from each bank 302 into a format that is compatible with accounting system 318.

Another Ethernet hub 320 couples concentrator 314 to a configuration workstation 322, a player server 324, and to one or more bonus servers 326. Configuration workstation 322 includes a user interface that enables an administrator to set up and/or to modify portions of gaming network 300 and/or servers 310, 324, and 326. Player server 324 tracks data of players using gaming machines 100. Player server 324 also controls messages that appear on each video display monitor 118 and/or information panel 120 of gaming machines 100. In the exemplary embodiment, player server 324 also stores physical characteristics of players, such as the player age and/or vision data. Bonus server 326 controls bonus applications or bonus systems on gaming network 300. Bonus server 326 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

Figure 5:
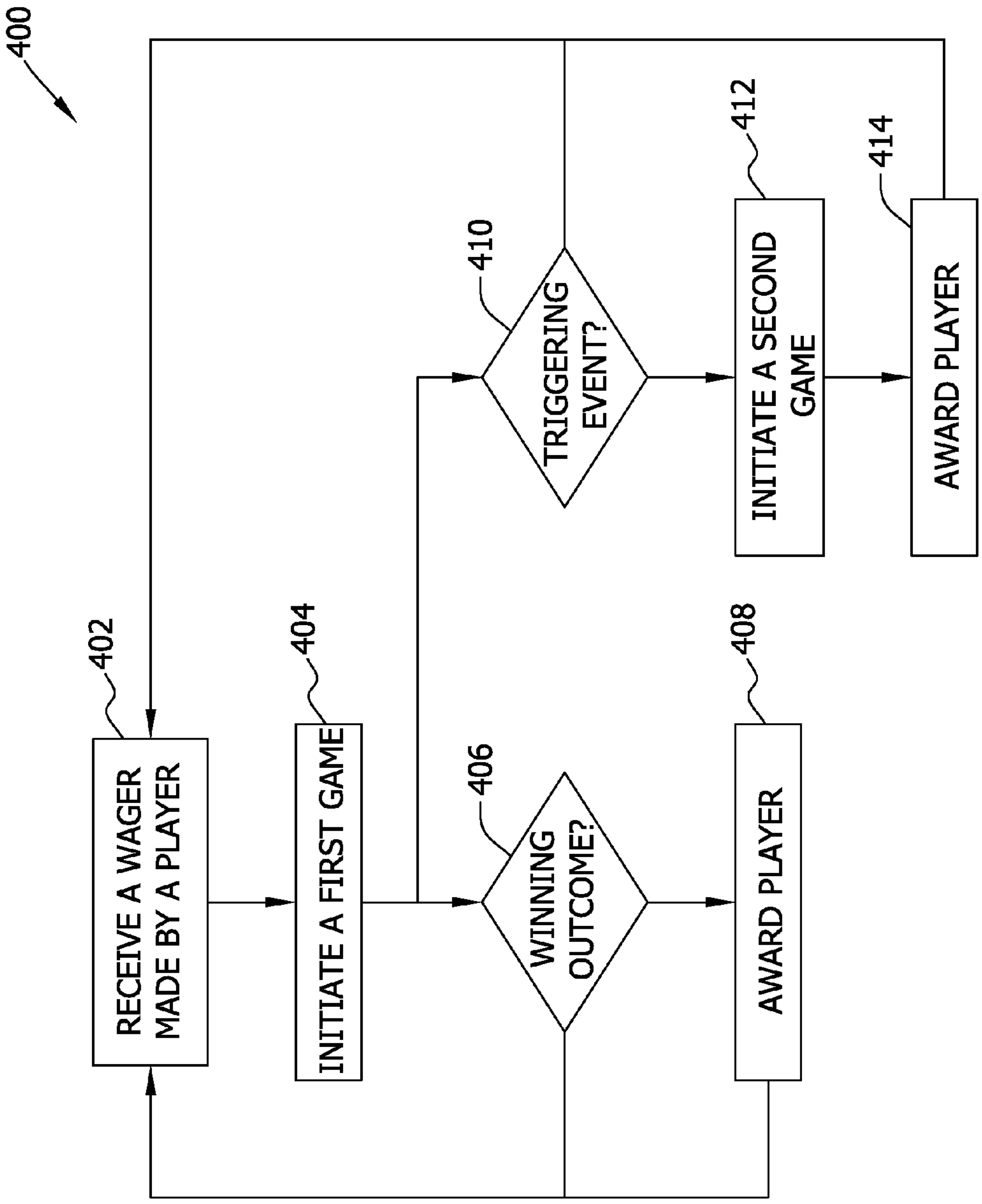
FIG. 5 is a flowchart illustrating an exemplary gaming method that may be used by the gaming machine shown in FIG. 1 and/or the gaming network shown in FIG. 4.

FIG. 5 is a flowchart 400 illustrating an exemplary gaming method that may be used by a gaming machine, such as gaming machine 100 (shown in FIG. 1), that includes a bonus wheel, such as bonus wheel 142 (shown in FIGS. 1-3). Referring to FIGS. 1-4, and in the exemplary embodiment, a player using gaming machine 100 deposits a number of credits using, for example, via coin acceptor 110, bill acceptor 112, and/or card reader 140 (each shown in FIG. 1). The player then wagers 402 at least a portion of the deposited credits. Once the player wagers enough credits, gaming machine 100 initiates 404 a first game. Specifically, controller 202 (shown in FIG. 3) monitors the number of credits deposited by the player and the number of credits wagered by the player. Once the player has deposited a sufficient number of credits and has wagered a predetermined minimum number of credits, controller 202 causes the first game to be displayed on video display 118.

During play of the first game, controller 202 determines 406 an outcome of the first game by, for example, randomly or pseudo-randomly selecting a result outcome to be displayed as game symbols using display 118. In some plays of the first game, the player may be awarded 408 a predetermined number of credits if a winning combination is displayed. Moreover, in some plays of the first game, the result outcome of the first game may include one of a number of predetermined triggering events. Such triggering events may include a particular combination of game symbols, or any other suitable game event that may be desired. Accordingly, in the exemplary embodiment, during play of the first game, controller 202 detects 410 a triggering event. When a triggering event, or a combination of triggering events, is detected, controller 202 initiates 412 play of a second game. During the second game, controller 202 initiates rotation of bonus wheel 142 (shown in FIGS. 1 and 2).

In the exemplary embodiment, during play of both the first game and the second game, controller 202 updates each electronic display device 152 (shown in FIG. 2) such that each electronic display device 152 shows a current award value. In some embodiments, each electronic display device 152 is associated with a respective progressive award. The progressive awards each increase based on, for example, a number of credits deposited in each gaming machine 100 on gaming network 300 (shown in FIG. 4). More specifically, each bank controller 304 (shown in FIG. 4) monitors the number of credits deposited by each gaming machine 100 in a respective bank 302 (shown in FIG. 4) and transmits the data to bonus server 326 (shown in FIG. 4). Bonus server 326 determines one or more progressive award amounts based on the data and transmits the progressive award amounts back to each controller 202 via respective bank controllers 304. Based on this data, controller 202 updates each electronic display device 152 to reflect a respective progressive award amount. In some embodiments, each electronic display device 152 displays the respective progressive award amount as a scrolling number in order to show the rate at which the respective progressive award amount is increasing. In some embodiments, each electronic display device 152 may reorient the respective progressive award amount at a predetermined rotational angle, such as approximately every 90.0 degrees from top position 156 (shown in FIG. 2).

When bonus wheel 142 stops, the player is awarded 414 with an award associated with the particular segment 144 (shown in FIGS. 1 and 2) at which bonus wheel 142 stops. More specifically, the player is awarded with the award associated with the particular segment 144 that stops at chosen segment indicator 150 (shown in FIG. 2). In some embodiments, the player may purchase one or more segment indicators 150 in order to increase the number of opportunities to win during play of the second game. Moreover, in some embodiments, the player may purchase one or more bonus multipliers to be applied to a particular segment indicator 150. In the exemplary embodiment, if during play of the second game, bonus wheel 142 stops rotating such that a particular segment indicator 150 is aligned with a particular electronic display device 152, the player is awarded with the award amount shown by the particular electronic display device 152. In some embodiments, multiple triggering events may be necessary before the player is eligible to receive the award amount.

Figure 6:
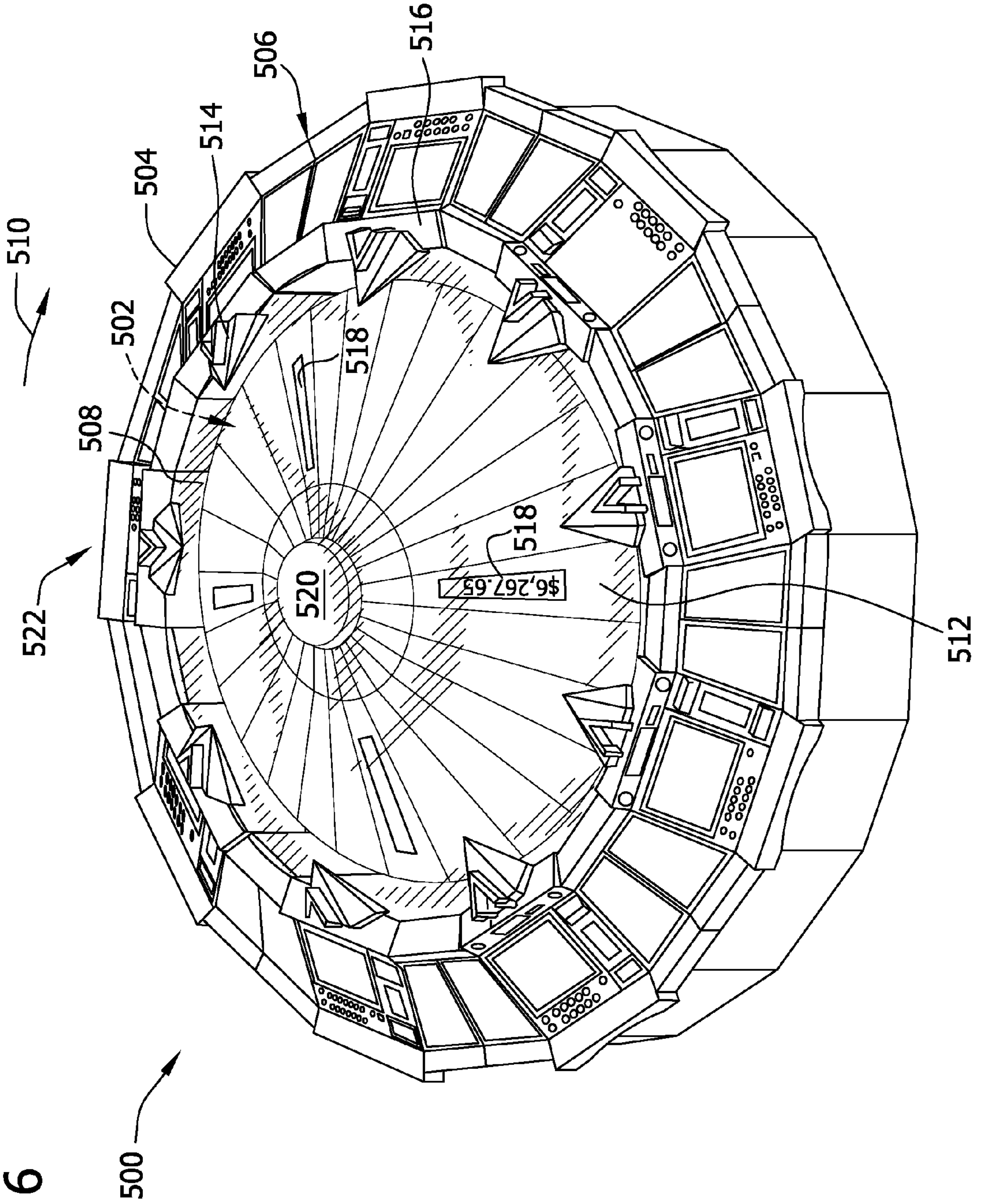
FIG. 6 is a schematic diagram of an exemplary gaming system.

FIG. 6 is a schematic diagram of an exemplary gaming system 500 that includes a shared multi-outcome display 502. In the exemplary embodiment, gaming system 500 includes a plurality of individual gaming machines 504 that are spaced apart about shared display 502 via respective spacer assemblies 506. Shared display 502 includes a display top 508 that is viewable by players of each gaming machine 504. In the exemplary embodiment, shared display 502 is configured to rotate in a clockwise direction as indicated by arrow 510. In an alternative embodiment, shared display 502 is configured to rotate in a counterclockwise direction. In the exemplary embodiment, shared display 502 is a mechanical wheel that includes a plurality of segments 512. An award symbol (not shown) is associated with each segment 512, and one or more awards are associated with each award symbol. The awards may be any suitable award including, but not limited to only including, credits, free wheel spins, free plays of the primary game, award multipliers, and/or any other award opportunities that may be made available.

In addition, in the exemplary embodiment, any player of gaming machines 504 may win an award designated by a respective segment 512. As shown in FIG. 6, each segment 512 is fixed spatially with respect to one another. As such, while two or more players may share in the same bonus event, each player playing the bonus event is provided with an individual outcome or award from a separate segment 512. Moreover, even if a player playing a gaming machine 504 is not participating in a particular bonus event, shared display 502 generates an outcome that is associated with the non-participating gaming machine 504. Accordingly, each time shared display 502 is activated, an individual outcome is generated for each gaming machine 504.

In the exemplary embodiment, each gaming machine 504 includes an indicator 514 that is positioned along a top surface 516 of each gaming machine 504. Each indicator 514 points to, or indicates, an award or outcome of shared display 502. More specifically, each indicator 514 points to, or indicates, a respective segment 512 when shared display 502 completes a spin in order to reveal a bonus event outcome. Each indicator 514 may be illuminated differently at different times or states of gaming machine 504 via an internal lighting device (not shown). The illumination of each indicator 514 may be based on, for example, whether the associated gaming machine 504 is playing a primary game, is in a state in which the player has committed to play of the bonus event using shared display 502, and/or whether the player has purchased an entry into a progressive bonus event using shared display 502.

Moreover, in the exemplary embodiment, at least a portion of segments 512 are embodied using electronic display devices 518. Each electronic display device 518 receives, such as continuously receives, an award value from, for example, a network controller (not shown in FIG. 6). For example, the network controller monitors an amount of coin in within the plurality of gaming machines 504 and determines a progressive bonus amount and/or jackpot bonus amount based at least on the monitored coin in amount. The network controller transmits the progressive bonus amount to a gaming system controller (not shown in FIG. 6). The gaming system controller then causes each electronic display device 518 to update, such as continuously update, the displayed progressive bonus amount. If shared display 502 stops at the completion of a bonus spin such that a particular segment indicator 514 that was purchased by a player indicates a particular electronic display device 518, the player is awarded the progressive bonus amount indicated by electronic display device 518. In some embodiments, each electronic display device 518 is coupled to a slip ring (not shown) in order to provide power and/or communications from, for example, a gaming system controller. Moreover, in some embodiments, a plurality of electronic display devices 518 are spaced evenly about a center 520 of shared display 502. In addition, in some embodiments, each electronic display device 518 is configured to re-orient the displayed progressive amount during the course of rotation of shared display 502. For example, if a value such as $12,345.67 is displayed on a particular electronic display device 518 at a position of approximately 90° from a top position 522 of shared display 502, the digits will be re-oriented each time the particular electronic display device 518 is rotated an additional 90°. In this way, viewers are able to read the amount without seeing the numbers oriented sideways or upside down. Each electronic display device 518 may be implemented using, for example, a light-emitting diode (LED) display, a liquid crystal display (LCD), a vacuum fluorescent display (VFD), or multi-layer display (MLD).

Figure 7:
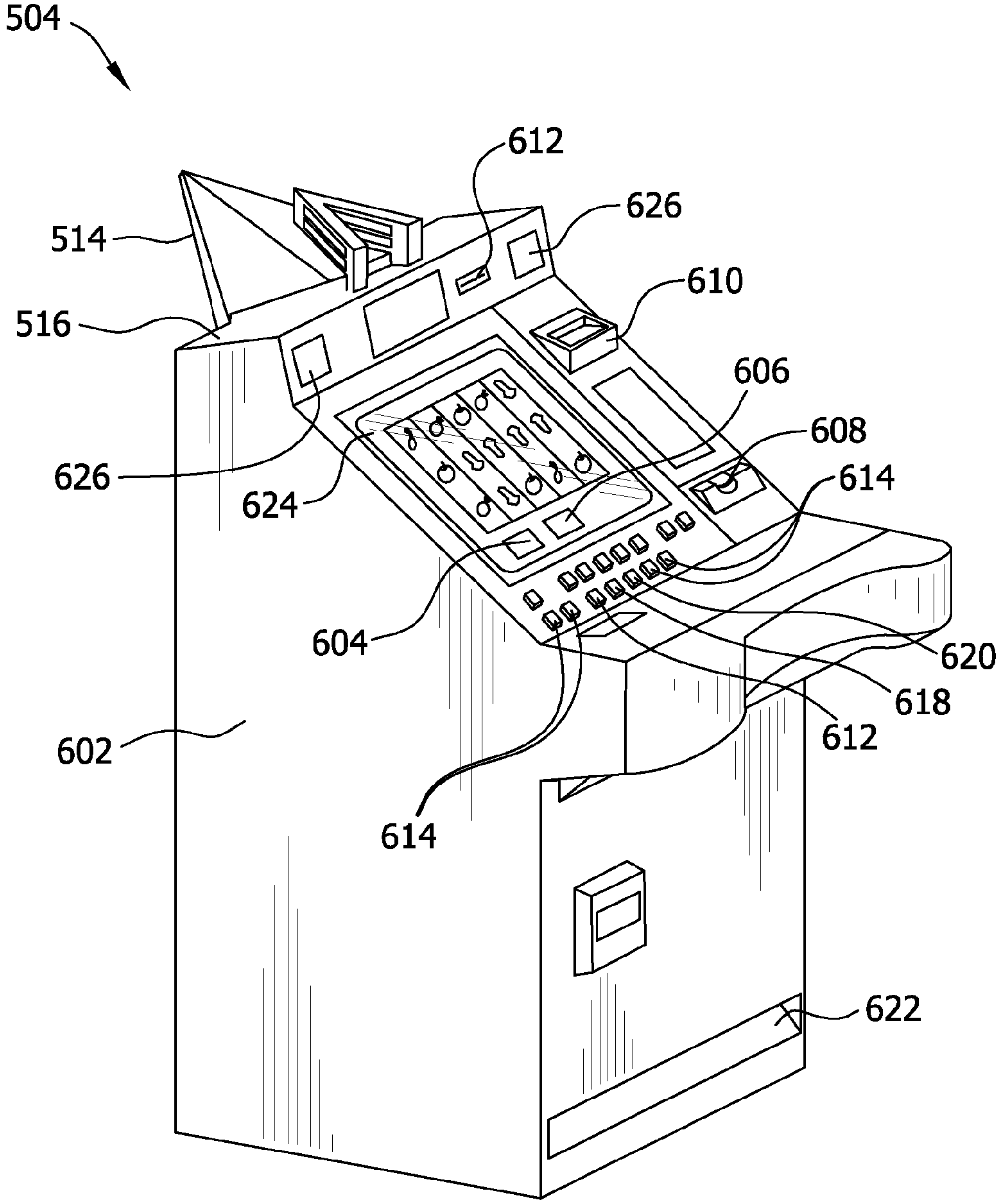
FIG. 7 is a schematic diagram of an exemplary gaming machine that may be used with the gaming system shown in FIG. 6.

FIG. 7 is a schematic diagram of an exemplary base gaming machine 504 that may be used with gaming system 500 (shown in FIG. 6). In the exemplary embodiment, gaming machine 504 includes a cabinet 602 that enables a player to play gaming machine 504 while sitting or standing. In some embodiments, cabinet 602 is positioned on a floor, on an elevated platform, or on a base or stand. In alternative embodiments, cabinet 602 may be configured as a pub-style table-top game, as a stand-alone gaming machine, or any other suitable manner.

In the exemplary embodiment, gaming machine 504 includes a credit display 604 that displays a player's current number of credits, cash, and/or account balance. Moreover, gaming machine 504 includes a bet display 606 that displays an amount wagered, a coin slot 608 that accepts coins and/or tokens, a bill acceptor 610 that accepts a bar-coded ticket, note, and/or cash, and a card reader 612 that accepts player-tracking cards, credit cards, and/or debit cards. Moreover, gaming machine 504 includes a plurality of input devices 614 including, but not limited to only including, a play button 616, a pull arm (not shown), a bet one button 618, and/or a cash out button 620. Play button 616 activates a primary game or other sequence of events within gaming system 500. Bet one button 618 adds a predetermined number of credits, such as one, to a player's wager. For each additional push of button 618 the number of wagered credits increases by a predetermined amount. Moreover, for each push of button 618, bet display 606 is updated to reflect the currently wagered number of credits and credit display 604 is updated to reflect the current credit balance remaining. Some embodiments of gaming machine 504 include other suitable input devices 614 such as a max bet button, a repeat bet button, one or more select payline buttons, and/or one or more select wager per payline buttons. Cash out button 620 initiates payment to a player corresponding to a remaining number of credits. The payment may be in the form of coins or tokens via a coin payout tray 622 and/or a ticket or credit slip. In the exemplary embodiment, gaming machine 504 also includes a display device 624 that displays a primary game. In addition to displaying the primary game, display device 624 may also be used to display any suitable secondary game associated with the primary game and/or information related to the primary game, secondary game, and/or shared display 502 (shown in FIG. 6). Display device 624 may be implemented as a cathode ray tube (CRT), a flat-panel liquid crystal display (LCD), a plasma display, an organic light-emitting diode (OLED) display, and/or any other electronically-controlled video display that incorporates a plurality of light devices. Moreover, display device 624 may include touch screen capabilities. In the exemplary embodiment, gaming machine 504 also includes one or more speakers 626 that generate sounds, such as music, sound effects relating to a primary game or secondary game, and/or sounds associated with an attract sequence. In some embodiments, display device 624 and speakers 626 may be configured to display a sequence of audio and/or visual attraction messages in order to attract potential players to gaming machine 504.

Figure 8:
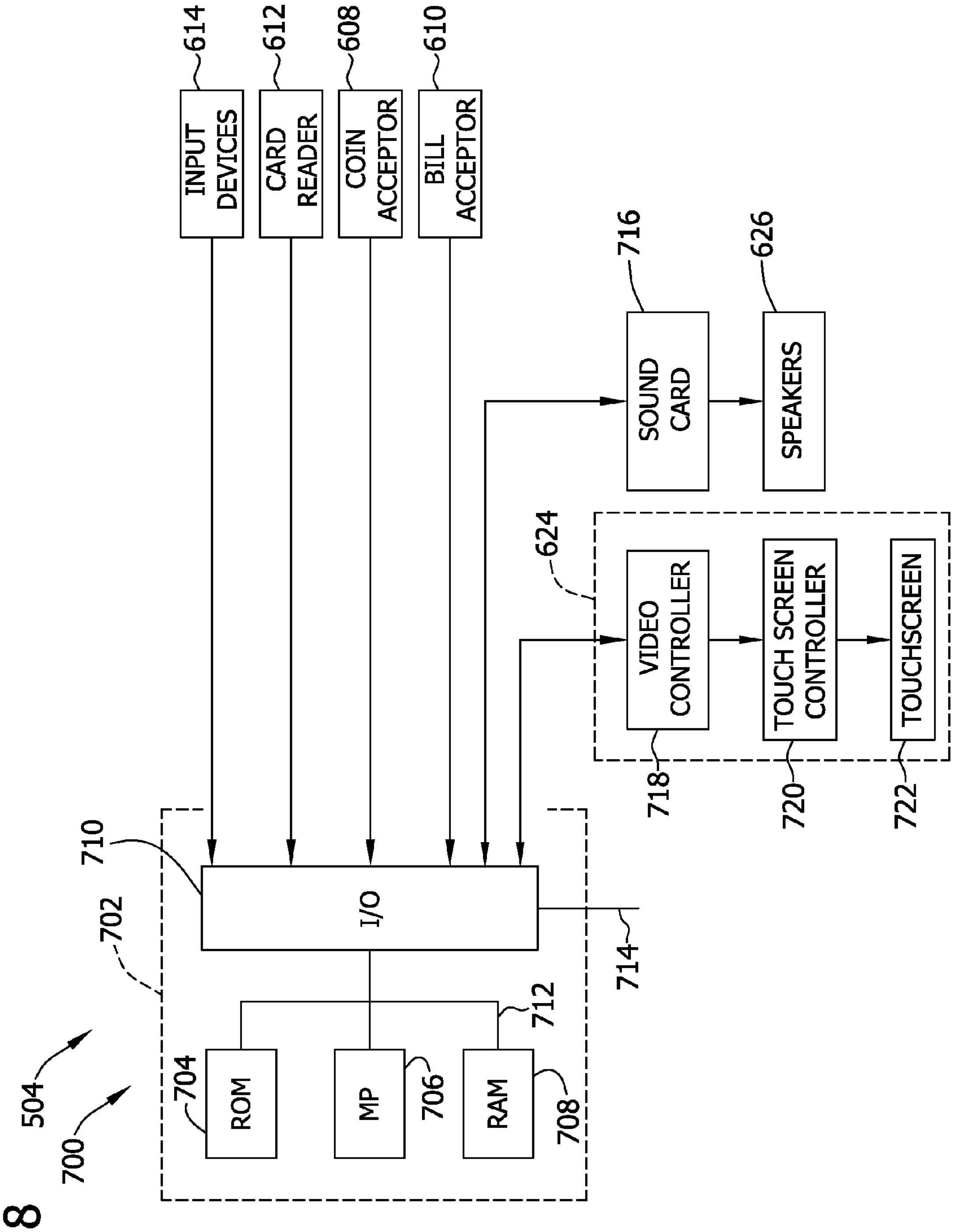
FIG. 8 is a block circuit diagram of an exemplary electrical architecture that may be used with the gaming machine shown in FIG. 6.

FIG. 8 is a block circuit diagram of an exemplary electrical architecture 700 incorporated into an exemplary gaming machine, such as gaming machine 504 of gaming system 500 (shown in FIG. 6). In the exemplary embodiment, architecture 700 includes a processor 702 that includes a read-only memory (ROM) 704, a microcontroller or microprocessor (MP) 706, a random-access memory (RAM) 708, and an input/output (I/O) circuit 710, that are each coupled via an address/data bus 712. As used herein, the terms "controller" and "processor" may include any programmable system including, but not limited to, systems using microcontrollers, reduced instruction set circuits (RISC), application specific integrated circuits (ASICs), logic circuits, and/or any other circuit or processor capable of executing the functions described herein. Such examples are exemplary only, and are thus not intended to limit in any way the definition and/or meaning of the terms "controller" or "processor". Alternative embodiments of controller 702 may include more than one microprocessor 706, multiple RAM modules 708, and/or multiple ROM modules 704. Moreover, although I/O circuit 610 is shown in FIG. 8 as a single component, one of ordinary skill in the art should appreciate that I/O circuit 710 may include any number or a plurality of different types of I/O circuits. Furthermore, RAM 708 and/or ROM 704 may be implemented as, for example, semiconductor memories, magnetically readable memories, and/or optically readable memories. In one embodiment, each operational component of gaming machine 504 is coupled to I/O circuit 710 via a respective conductor. Alternative embodiments may include only a single coupling between the operational components of gaming machine 504 and I/O circuit 710. In the exemplary embodiment, I/O circuit 710 is coupled to a gaming network (not shown in FIG. 8) via a network interface 714. Moreover, in the exemplary embodiment, architecture 700 includes a sound card 716 that generates audio signals and that communicates audio signals between I/O circuit 710 and speakers 626. Furthermore, in the exemplary embodiment, architecture 700 includes a video controller 718 and a touchscreen controller 720 that generate video signals and communicate the vide signals and touchscreen data between I/O circuit 710 and a touchscreen 722.

Figure 9:
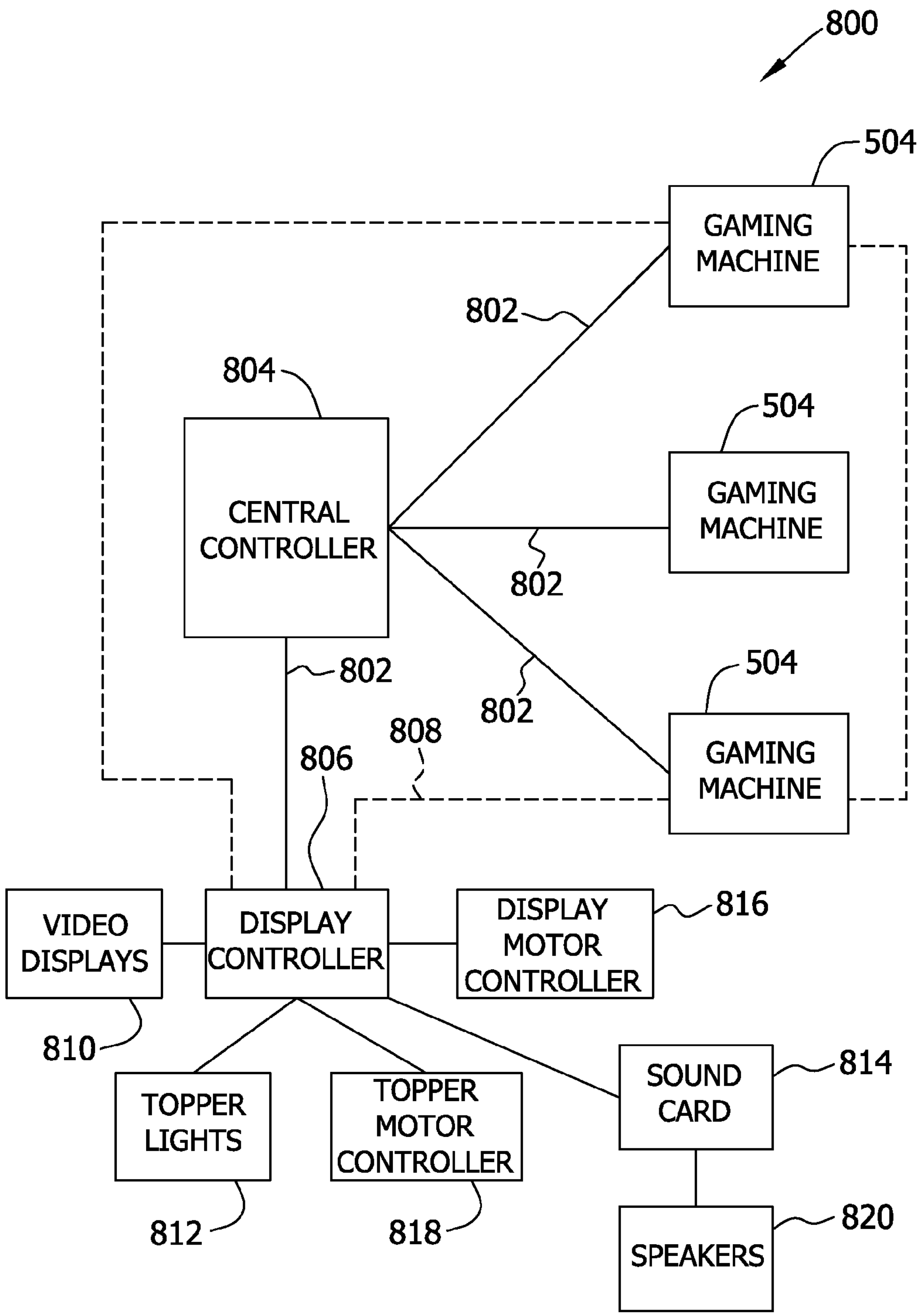
FIG. 9 is a block diagram of an exemplary wide area gaming system that includes the gaming system shown in FIG. 6.

FIG. 9 is a block diagram of an exemplary wide area gaming system 800 that may include gaming system 500 (shown in FIG. 6). In the exemplary embodiment, additional gaming machines 504 may be connected to centrally located gaming system 500 using a remote communication link 802 such that some or all of the functions of each gaming machine

504 are provided by a central controller 804. More specifically, processor 702 (shown in FIG. 8) of each gaming machine 504 may be programmed to facilitate transmission of signals representative of game play and/or bonus game play between gaming machine 504 and central controller 804. Each gaming machine 504 and central controller 804 may be arranged on a local area network (LAN), in which one or more gaming machines 504 are proximate to each other and on the same site as central controller 804. Alternatively, each gaming machine 504 and central controller 804 may be arranged on a wide area network (WAN), in which one or more gaming machines 504 are located at a different site than other gaming machines 504 and/or central controller 804. Communication link 802 may be an intranet or the Internet.

In some embodiments, a game outcome provided to a player at a particular gaming machine 504 is determined by central controller 804, and is then provided to the player. In response to a player initiating game play, gaming machine 504 requests a game outcome from central controller 804. Central controller 804 randomly generates the game outcome and then transmits the game outcome to gaming machine 504 via communication link 802. The generated game outcome may include a primary game outcome, a secondary game outcome, and/or a shared display bonus outcome.

In some embodiments, central controller 804 maintains one or more pools of predetermined game outcomes. In response to a game outcome request received from gaming machine 504, central controller 804 selects a predetermined game outcome from the pool of predetermined game outcomes. Central controller 804 marks the selected game outcome as used such that, once the selected game outcome is marked as used, it is prevented from being selected again until a predetermined time or triggering event has occurred. The predetermined game outcome may include a primary game outcome, a secondary game outcome, and/or a shared display bonus outcome.

In some embodiments, each gaming machine 504 independently generates a game outcome, and transmits the game outcome to central controller 804 via communications link 802. Central controller 804 monitors the activities and events occurring on each gaming machine 504, including monitoring accounting and player tracking using a player database for storing player profiles, a player tracking module for tracking players, and/or a credit system for providing automated casino transactions.

In some embodiments, gaming machines 504 are coupled to central controller 804 in a progressive configuration. A portion of each wager made in order to initiate a primary game is allocated to bonus or secondary event awards. Central controller 804 monitors the allocation process and determines when the allocated portions reach a predetermined threshold, thereby enabling the progressive jackpot.

In the exemplary embodiment, gaming system 800 also includes a display controller 806 that is coupled to central controller 804 via communication link 802. In some embodiments, display controller 806 is also coupled to gaming machines 504 via an additional communication link 808. In the exemplary embodiment, display controller 806 is also coupled to one or more video displays 810, one or more topper lights 812, a sound card 814, a display motor controller 816, and a topper motor controller 818. Video display 810 displays images or sequences of images such as, but limited to, attraction sequences, bonus initiation sequences, and the like. Display motor controller 816 is coupled to shared display 502 (shown in FIG. 6), and controls the speed and/or direction of rotation of shared display 502. Display controller 806 communicates with sound card 814 in order to generate sound signals for output by one or more speakers 820. The sound signals may be output in conjunction with the images or sequences of images displayed by video display 810 and/or with rotation of shared display 502.

During operation, gaming system 500 operates substantially similar to gaming network 300 (shown in FIG. 4). In the exemplary embodiment, a player using gaming machine 504 (shown in FIGS. 6 and 7) deposits a number of credits using, for example, coin slot 608, bill acceptor 610, and/or card reader 612 (each shown in FIG. 7). The player then wagers at least a portion of the deposited credits. Once the player wagers enough credits, gaming machine 504 initiates a first game. Specifically, controller 702 (shown in FIG. 8) monitors the number of credits deposited by the player and the number of credits wagered by the player. Once the player has deposited a sufficient number of credits and has wagered a predetermined minimum number of credits, controller 702 causes the first game to be displayed on display device 624 (shown in FIGS. 7 and 8).

During play of the first game, controller 702 determines an outcome of the first game by, for example, randomly or pseudo-randomly selecting a result outcome to be displayed as game symbols using display device 624. In some plays of the first game, the player may be awarded a predetermined number of credits if a winning combination is displayed. Moreover, in some plays of the first game, the result outcome of the first game may include one of a number of predetermined triggering events. Such triggering events may include a particular combination of game symbols, or any other suitable game event that may be desired. Accordingly, in the exemplary embodiment, during play of the first game, controller 702 detects a triggering event. When a triggering event, or a combination of triggering events, is detected, controller 702 initiates play of a second game. During the second game, controller 702 initiates rotation of shared display 502 (shown in FIG. 6).

In the exemplary embodiment, during play of both the first game and the second game, controller 702 updates each electronic display device 518 (shown in FIG. 6) such that each electronic display device 518 shows a current award value. In some embodiments, each electronic display device 518 is associated with a respective progressive award. The progressive awards each increase based on, for example, a number of credits deposited in each gaming machine 404 in gaming system 800 (shown in FIG. 9). More specifically, each central controller 804 (shown in FIG. 9) monitors the number of credits deposited by each gaming machine 404, and determines one or more progressive award amounts based on the data. Central controller 804 updates each electronic display device 518 to reflect a respective progressive award amount. In some embodiments, each electronic display device 518 presents the respective progressive award amount as a scrolling number in order to show the rate at which the respective progressive award amount is increasing. In some embodiments, each electronic display device 518 may reorient the respective progressive award amount at a predetermined rotational angle, such as approximately every 90.0 degrees from top position 502 (shown in FIG. 6).

When shared display 502 stops, the player is awarded with an award associated with the particular segment 512 (shown in FIG. 6) at which shared display 502 stops. More specifically, the player is awarded with the award associated with the particular segment 512 that stops at segment indicator 514 (shown in FIGS. 6 and 7). In some embodiments, the player may wager an additional number of credits in order to change a bonus level associated with segment indicators 514. Moreover, in some embodiments, the player may purchase one or more bonus multipliers to be applied to segment indicator 514. In the exemplary embodiment, if during play of the second game, shared display 502 stops rotating such that segment indicator 514 is aligned with a particular electronic display device 518, the player is awarded with the award amount shown by the particular electronic display device 518. In some embodiments, multiple triggering events may be necessary before the player is eligible to receive the award amount.

The systems, methods, and apparatus described herein facilitate implementing a multi-level progressive game for use with gaming machines and/or gaming networks, wherein a rotating bonus wheel includes one or more scrolling progressive displays that each display a continually updated progressive award amount. Displaying a continually updated progressive award amount increases player anticipation before and during play of a gaming machine by making the player more aware of the award amounts that may be won. In addition, including multiple scrolling displays facilitates providing multiple progressive awards on a single bonus wheel, which also increases player anticipation and excitement.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Exemplary embodiments of systems, methods, and apparatus for controlling a gaming machine display are described above in detail. The systems, methods, and apparatus are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and apparatus as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:

a memory;

a first display device configured to display a first game;

a second display device configured to display a second game, said second display device includes:

a wheel rotatably attached to a display housing and configured to rotate about a center axis of the wheel, the wheel having a plurality of segments, at least one of said plurality of segments includes an electronic display device, wherein the electronic display device is configured to rotate about the center axis when the wheel spins, a plurality of physical segment indicators positioned about an exterior circumference of the wheel, wherein the plurality of segment indicators do not rotate about the center axis when the wheel rotates about the center axis, wherein each segment indicator of the plurality of segment indicators indicates a single segment of the wheel when the wheel is in a stationary position; determining a number of segment indicators that the player has purchased; indicating an outcome to the second game based at least in part on the number of segment indicators that the player has purchased; and a processor coupled to said memory, to said first display device, and to said second display device, said processor is configured to:

enable play of the first game in response to a wager made by the player;

enable play of the second game upon detection of a triggering event during play of the first game; and during play of the first game and the second game, update said electronic display device to display a change in an award value.

2. A gaming machine in accordance with claim 1, wherein said wheel is a rotatable bonus wheel.

3. A gaming machine in accordance with claim 1, wherein said electronic display device comprises one of a light-emitting diode (LED) display, a liquid crystal display (LCD), a vacuum fluorescent display (VFD), and multi-layer display (MLD).

4. A gaming machine in accordance with claim 1, wherein said processor is configured to substantially continuously update said electronic display device.

5. A gaming machine in accordance with claim 1, wherein said plurality of segments comprises a plurality of electronic display devices.

6. A gaming machine in accordance with claim 5, wherein said processor is coupled to a plurality of electronic display devices, said processor is configured to update the plurality of electronic display device to reflect a respective award value.

7. A gaming machine in accordance with claim 5, wherein said plurality of electronic display devices are spaced substantially evenly about the center axis of said second display device.

8. A gaming machine in accordance with claim 5, wherein at least one of said plurality of electronic display devices is associated with a respective progressive award.

9. A gaming machine in accordance with claim 1, further comprising a slip ring configured to communicatively couple said electronic display device to said processor.

10. A gaming machine comprising:

a memory;

a rotatable display device rotatable on a central axis and rotatably attached to a gaming machine housing, the rotatable display device comprising a plurality of segments, at least one of said plurality of segments comprises an electronic display device, wherein the electronic display device is configured to rotate about the central axis when the rotatable display device rotates about the central axis;

a plurality of physical segment indicators positioned about an exterior perimeter of the rotatable display device, wherein the plurality of segment indicators do not rotate about the central axis when the rotatable display device rotates about the central axis, wherein each segment indicator of the plurality of segment indicators indicates a single segment of the rotatable display device when the rotatable display device is in a stationary position; determining a number of segment indicators that the player has purchased; indicating an outcome to the second game based at least in part on the number of segment indicators that the player has purchased; and a processor coupled to said memory and said rotatable display device, said processor configured to:

enable play of a first game based on a wager made by a player; detect a triggering event during play of the first game;

enable play of a second game based on the detection of the triggering event; and during play of the first game and the second game, update said at least one electronic display device to change an award value of a progressive game associated with one of said plurality of segments.

11. A gaming machine in accordance with claim 10, wherein said electronic display device comprises one of a light-emitting diode (LED) display, a liquid crystal display (LCD), a vacuum fluorescent display (VFD), and multi-layer display (MLD).

12. A gaming machine in accordance with claim 11, wherein said processor is configured to automatically update said at least one electronic display device to reflect the current award value.

13. A gaming machine in accordance with claim 10, wherein said plurality of segments comprises a plurality of electronic display devices.

14. A gaming machine in accordance with claim 13, wherein said processor is coupled to each of said plurality of electronic display devices, said processor is configured to update each electronic display device to reflect a respective award value of a respective progressive game.

15. A gaming machine in accordance with claim 13, wherein said plurality of electronic display devices are spaced substantially evenly about a center of said rotatable display device.

16. A gaming machine in accordance with claim 10, further comprising a slip ring configured to communicatively couple said electronic display device to said processor.

17. A gaming method comprising:

accepting a wager made by a player of a gaming machine;

enabling play of a first game using the gaming machine, wherein the first game is displayed using a first display device;

detecting a triggering event during play of the first game;

enabling play of a second game using the gaming machine, the second game displayed using a second display device having a wheel rotatable on a central axis, the wheel including a plurality of segments, wherein at least one of the plurality of segments is an electronic display device, wherein the electronic display device is configured to rotate about the central axis when the wheel rotates about the central axis, wherein an outcome of the second game is indicated through a plurality of segment indicators positioned about the circumference of the wheel, wherein the plurality of segment indicators do not rotate about the central axis when the wheel rotates about the central axis, wherein each segment indicator of the plurality of segment indicators indicates a single segment of the wheel when the wheel is in a stationary position;

determining a number of segment indicators that the player has purchased;

indicating an outcome to the second game based at least in part on the number of segment indicators that the player has purchased; and during play of the first game and the second game, updating the electronic display device to reflect a change in an award value to a current award value.

18. A gaming method in accordance with claim 17, wherein enabling play of a second game comprises initializing rotation of the second display device.

19. A gaming method in accordance with claim 17, wherein updating the electronic display device comprises substantially continuously updating the electronic display device to reflect the current award value.

20. A gaming method in accordance with claim 17, wherein the plurality of segments includes a plurality of electronic display devices, said method further comprising updating the plurality of electronic display devices to reflect a respective award value.

21. A gaming method in accordance with claim 17, wherein updating the electronic display device comprises transmitting the current reward value to the electronic display device via a slip ring.

22. A gaming system comprising:

a plurality of gaming machines, each gaming machine configured to display a first game;

a shared display configured to display a second game, said shared display comprises:

a wheel rotatably attached to a housing of the shared display and configured to rotate about a center axis of the wheel, the wheel having a plurality of segments, at least one of said plurality of segments comprises an electronic display device, wherein the electronic display device is configured to rotate about the center axis when the wheel spins, and a plurality of physical segment indicators positioned about an exterior circumference of the wheel, wherein the plurality of segment indicators do not rotate about the center axis when the wheel rotates about the center axis, wherein each segment indicator of the plurality of segment indicators indicates a single segment of the wheel when the wheel is in a stationary position; determining a number of segment indicators that the player has purchased; indicating an outcome to the second game based at least in part on the number of segment indicators that the player has purchased; and a controller coupled to said plurality of gaming machines and to said shared display, said controller configured to:

detect a triggering event during play of the first game on at least one of said plurality of gaming machines;

enable play of the second game upon detection of the triggering event; and during play of the first game and the second game, update said electronic display device to change a current award value of the segment associated with the electronic display device.

23. A gaming system in accordance with claim 22, wherein said controller is configured to initiate rotation of said rotatable wheel during play of the second game.

24. A gaming system in accordance with claim 22, wherein said electronic display device comprises one of a light-emitting diode (LED) display, a liquid crystal display (LCD), a vacuum fluorescent display (VFD), and multi-layer display (MLD).

25. A gaming system in accordance with claim 22, wherein said controller is configured to substantially continuously update said electronic display device to reflect the current award value.

26. A gaming system in accordance with claim 22, wherein said plurality of segments comprises a plurality of electronic display devices.

27. A gaming system in accordance with claim 26, wherein said controller is coupled to each of said plurality of electronic display devices, said controller is configured to update each electronic display device to reflect a respective award value of a respective progressive game.

28. A gaming system in accordance with claim 26, wherein said plurality of electronic display devices are spaced substantially evenly about a center of said shared display.

29. A gaming system in accordance with claim 26, wherein each of said plurality of electronic display devices is associated with a respective progressive award.

30. A gaming system in accordance with claim 22, further comprising a slip ring configured to communicatively couple said electronic display device to said controller.

31. A gaming method comprising:

accepting a wager made by a player using at least one of a plurality of gaming machines;

enabling play of a first game using the plurality of gaming machines;

detecting a triggering event during play of the first game;

enabling play of a second game, the second game displayed using a shared display having a wheel rotatable on a central axis, the wheel includes a plurality of segments, wherein at least one of the plurality of segments is an electronic display device configured to rotate about the central axis when the wheel is rotating about the central axis;

initiating rotation of the wheel;

indicate an outcome to the second game through a plurality of physical segment indicators positioned about an exterior circumference of the wheel, wherein the plurality of segment indicators do not rotate about the central axis when the wheel rotates, wherein each segment indicator indicates a single segment of the wheel when the wheel is in a stationary position; determining a number of segment indicators that the player has purchased; indicating an outcome to the second game based at least in part on the number of segment indicators that the player has purchased; and during play of the first game and the second game, updating the electronic display device to change a current award value of the at least one segment.

32. A gaming method in accordance with claim 31, wherein the plurality of segments includes a plurality of electronic display devices, said method further comprising updating each of the plurality of electronic display devices to reflect a respective award value.

33. A gaming method in accordance with claim 31, wherein updating the electronic display device comprises transmitting the current reward value to the electronic display device via a slip ring.

34. A gaming method in accordance with claim 31, wherein updating the electronic display device comprises substantially continuously updating the electronic display device to reflect the current award value.

* * * * *